(12) United States Patent
Browne et al.

(10) Patent No.: US 8,104,278 B2
(45) Date of Patent: Jan. 31, 2012

(54) ENERGY HARVESTING, STORING, AND CONVERSION UTILIZING SHAPE MEMORY ACTIVATION

(75) Inventors: Alan L. Browne, Grosse Pointe, MI (US); Nancy L. Johnson, Northville, MI (US); Marten Wittorf, Ingelheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 574 days.

(21) Appl. No.: 12/245,677

(22) Filed: Oct. 3, 2008

(65) Prior Publication Data

US 2009/0241537 A1  Oct. 1, 2009

Related U.S. Application Data

(63) Continuation-in-part of application No. 12/059,861, filed on Mar. 31, 2008.

(51) Int. Cl.
*F01B 29/10* (2006.01)

(52) U.S. Cl. .............................................. 60/527; 60/528
(58) Field of Classification Search ............. 60/527–529
See application file for complete search history.

(56) References Cited

U.S. PATENT DOCUMENTS

| 6,851,260 | B2 * | 2/2005 | Mernøe ........................... 60/527 |
| 6,928,812 | B2 * | 8/2005 | Donakowski et al. ........... 60/527 |
| 7,305,824 | B1 * | 12/2007 | Barvosa-Carter et al. ...... 60/527 |
| 7,823,382 | B2 * | 11/2010 | Ukpai et al. ..................... 60/527 |

* cited by examiner

*Primary Examiner* — Hoang Nguyen

(57) ABSTRACT

A system for and method of harvesting, storing and converting naturally occurring energy, includes exposing an active material, and more preferably a shape memory element to an ambient activation signal or condition, harvesting a portion of the energy by pseudoplastically straining or superelastically deforming the element, storing the energy by causing a change in the element and/or engaging a locking mechanism, and converting the energy by exposing the mechanism to an activation signal and/or otherwise releasing the mechanism.

19 Claims, 2 Drawing Sheets

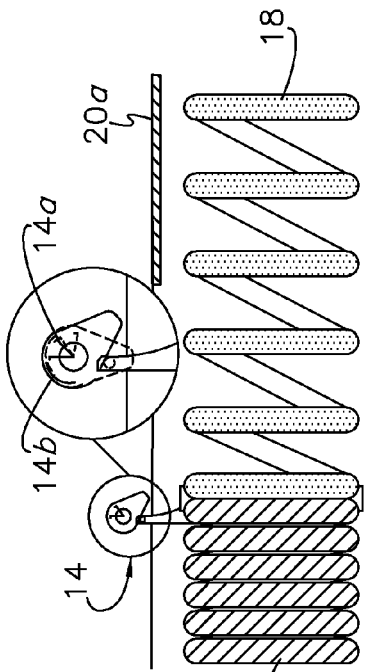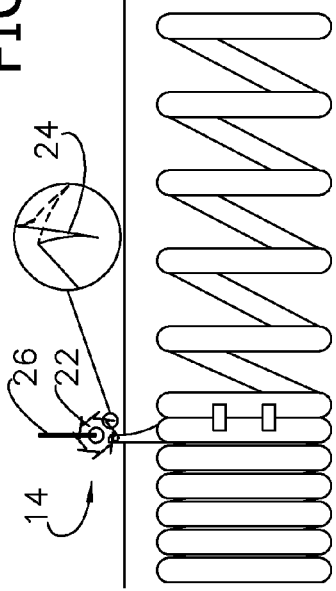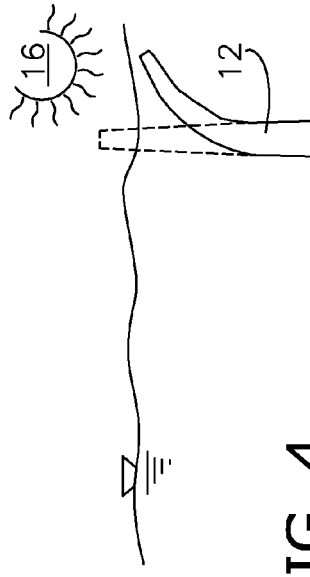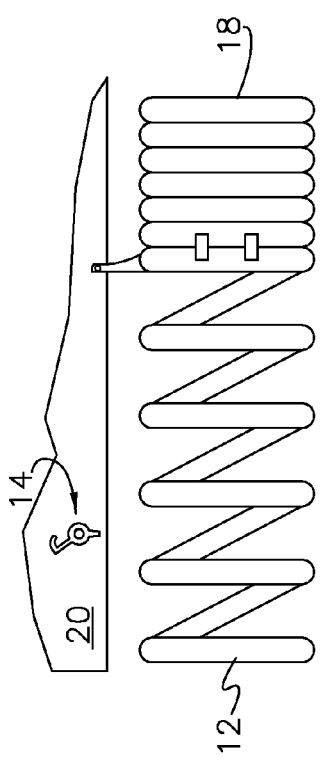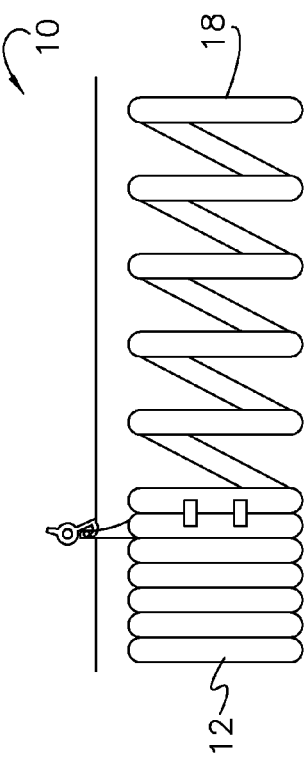

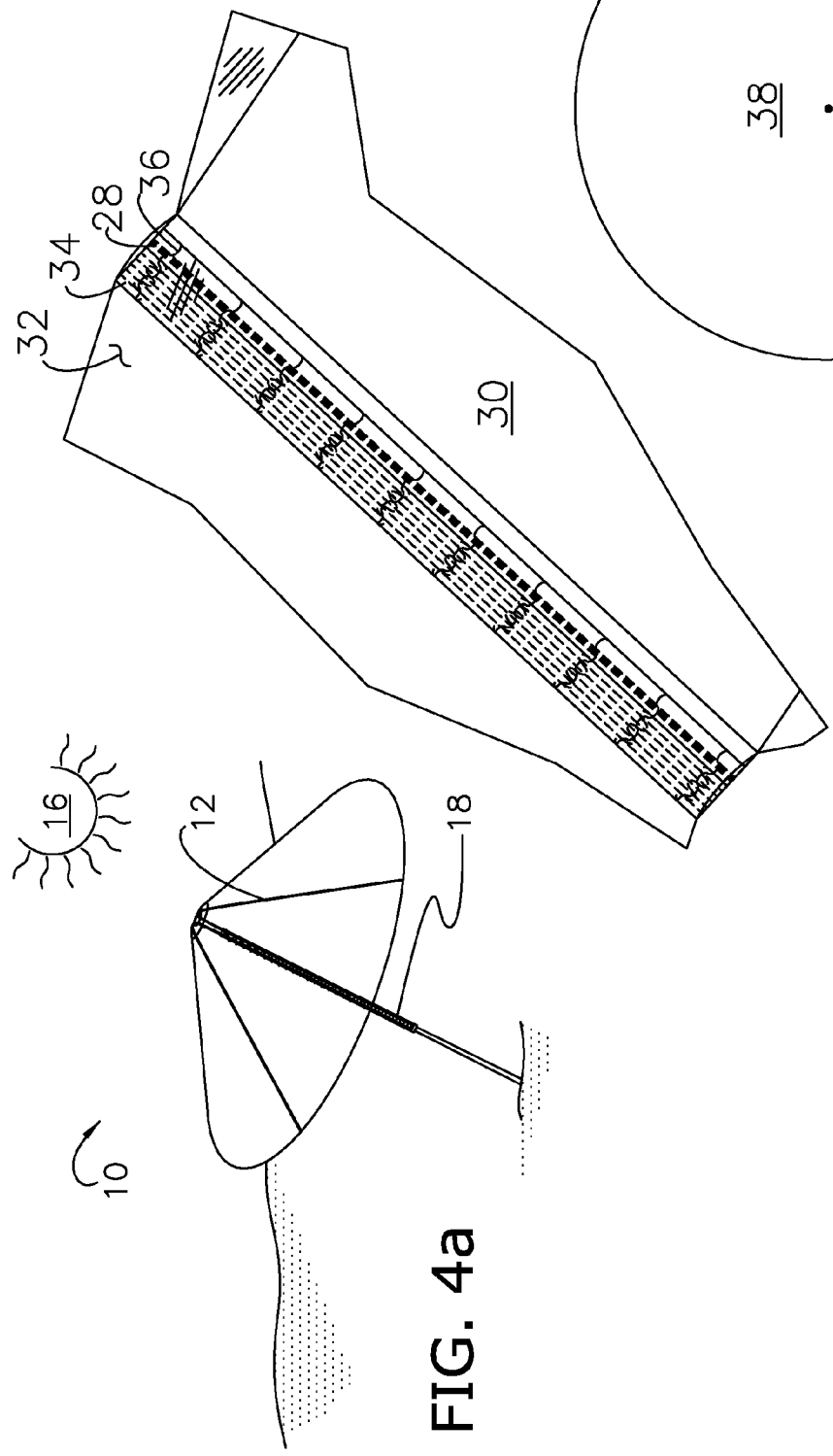

ENERGY HARVESTING, STORING, AND CONVERSION UTILIZING SHAPE MEMORY ACTIVATION

This application claims priority to and is a continuation-in-part of U.S. patent application Ser. No. 12/059,861 filed on Mar. 31, 2008, and entitled METHODS OF DEPLOYING A COVER UTILIZING ACTIVE MATERIAL AND AN EXTERNAL HEAT SOURCE, the disclosure of which is incorporated by reference herein.

BACKGROUND OF THE INVENTION

1. Technical Field

The present invention relates to mechanical systems for and methods of harvesting, storing and converting natural or ambient energy, and more particularly to such systems and methods that utilize the activation of shape memory materials for doing the same.

2. Background Art

Active materials, such as shape memory alloys (SMA) and polymers (SMP), have become increasingly used in the mechanical arts to convert energy harvested from an activation signal into work. Upon deactivation (i.e., termination of exposure to the activation signal) the material typically reverts back to its original state. The use of active material elements, it is appreciated, increases energy efficiency, while reducing weight and complexity in comparison to counterpart electro-mechanical, hydraulic, and pneumatic motors. Concernedly, however, these systems and methods typically rely upon artificially generated signals (such as an electric current, magnetic field, or voltage drop) created by an automated and/or manually initiated source For example, the charging system of a vehicle is often used to drive active material based systems in vehicular settings. Though providing on-demand activation capability, the necessary inclusion of these sources results in increased engineering, construction, operation, and maintenance costs to the overall system.

BRIEF SUMMARY

In response to the afore-mentioned concerns, the present invention provides systems for and methods of harvesting and converting energy from natural or ambient sources, using SMA, SMP or other active materials. As such, this invention is useful, among other things, for taking advantage of abundant, inexorable and free energy sources, such as the wind and natural water flows. Moreover, to effect on-demand actuation the inventive system is further useful for advantageously storing (i.e., retaining the harvested energy over a period, so as to enable delayed release) the activation energy harvested by the active materials.

In a preferred embodiment, a method of harvesting, storing, and releasing naturally occurring energy utilizing a shape memory alloy element is presented. The method generally includes exposing the element to a naturally occurring condition having energy (such as air or water flow), harvesting and storing a portion of the energy by absorbing said portion with, so as to pseudoplastically strain or superelastically deform the element, holding the storage element in the changed condition, and converting the portion of energy to work by exposing the element to an activation signal (including naturally occurring conditions) or releasing a locking mechanism, so as to enable the element to return to its original condition. In a preferred embodiment, unlocking the element includes the step of also exposing a locking mechanism comprising, for example, SMP to a naturally occurring activation signal.

Other aspects and advantages of the present invention, including the employment of an SMA/SMP biasing spring, and exemplary locking mechanisms will be apparent from the following detailed description of the preferred embodiment(s) and the accompanying drawing figures.

BRIEF DESCRIPTION OF THE SEVERAL VIEWS OF THE DRAWING

A preferred embodiment(s) of the invention is described in detail below with reference to the attached drawing figures, wherein:

FIG. 1 is an elevation view of a system including an SMA energy storage spring, biasing spring attached to the SMA spring, and a locking mechanism presenting a latch, in accordance with a preferred embodiment of the invention;

FIG. 1*a* is an elevation view of the system shown in FIG. 1, wherein the SMA spring is fully actuated, thereby allowing the biasing spring to stretch due to a greater spring modulus;

FIG. 1*b* is an elevation view of a system shown in FIGS. 1 and 1*a*, wherein the SMA spring is deactivated but locked in an activated condition by the latch as the storage and biasing springs try to revert back to their original condition;

FIG. 2 is an elevation view of the system shown in FIG. 1, wherein the locking mechanism presents a pawl comprising an shape memory torsion spring, in accordance with a preferred embodiment of the invention;

FIG. 3 is an elevation view of the system shown in FIG. 1, wherein the locking mechanism presents the gear wheel of a ratchet-based mechanism, the gear wheel is formed of SMP, so as to present flexible teeth (shown in caption) when activated, and the wheel is further attached to an SMA wire that facilitates disengagement when activated, in accordance with a preferred embodiment of the invention;

FIG. 4 is an elevation view of a system including an active material (e.g., wave breaker, basin outlet, etc.) element being engaged by a naturally occurring condition (e.g., water pressure/flow);

FIG. 4*a* is a perspective view of a sun umbrella including an active material element configured to self-open the umbrella, when activated, and a biasing spring configured to self-close the umbrella, when the element is deactivated, in accordance with a preferred embodiment of the invention;

FIG. 5 is a perspective view of a vehicle employing a deployable sunshade having passively actuated and stowed actuators, in accordance with a preferred embodiment of the present invention; and FIG. 6 is a schematic elevation of a flywheel and active material element presenting a torque overboost, in accordance with a preferred embodiment of the present invention.

DETAILED DESCRIPTION

The present invention concerns a system 10 for harvesting, storing, and converting the activation energy of shape memory alloys (SMA) and shape memory polymers (SMP). More particularly, included within the scope of this invention are methodologies of storage based on the temperature, light, and/or moisture activated modulus changes in various formulations of SMP (inclusive of both thermoplastic and thermoset SMP); methodologies based on both thermal and stress activated stiffness (elastic modulus) changes and shape memory in SMA (these being changes that accompany phase changes between Martensite and Austenite phases); and hybrid combinations thereof.

In preferred applications more specifically discussed herein, harvesting, storing and converting ambient and/or natural energy is used to improve vehicle performance and fuel economy by harvesting and storing solar and/or waste thermal energy for use in infrequent demand applications. For example, energy may be stored in hood lift springs (not shown) for pedestrian impact through cyclic thermal activation of SMA ratchet based mechanism, actuators for window shade deployment, and release/engagement of door, trunk, or power locks. Moreover, the system 10 may be used to enable self-powered and self-controlled automotive systems including distributed passive activation for sealing (such as the seals between swing panels such as doors and the vehicle body), distributed energy storage for on-demand release of safety features such as reversibly expandable interior padding. Finally, natural energy conversion may be used to enable wireless embedded low-power (MEMS) sensors and actuators, such as for example, in distributed structural health monitoring and actuation.

The system 10 structurally includes an active material element 12, such as an SMA spring/wire, that when activated is caused to achieve a memorized shape or a modified characteristic value; and when deactivated, returns to the non-activated condition (compare FIGS. 1-1b). It is appreciated, however, that certain active materials do not automatically revert upon discontinuation of the activation signal, and that in this configuration, alternative means can be employed to revert the active material to its original state.

The inventive system 10 also employs a locking mechanism 14 (FIGS. 1-3) that retains the change in shape or characteristic of the energy storage element 12. The mechanism 14 may be conventional, or, as further described herein, may also comprise an active material configured to effect locking also through the absorption of a natural and/or ambient signal.

I. Active Material Discussion and Function

As used herein the term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Thus, active materials shall include those compositions that can exhibit a change in stiffness properties, shape and/or dimensions in response to the activation signal, which can take the type for different active materials, of electrical, magnetic, thermal and like fields.

Preferred active materials for use with the present invention include but are not limited to the classes of shape memory materials, and combinations thereof. Shape memory materials generally refer to materials or compositions that have the ability to remember their original at least one attribute such as shape, which can subsequently be recalled by applying an external stimulus. As such, deformation from the original shape is a temporary condition. In this manner, shape memory materials can change to the trained shape in response to an activation signal. Exemplary shape memory materials include the afore-mentioned shape memory alloys (SMA) and shape memory polymers (SMP), as well as shape memory ceramics, electroactive polymers (EAP), ferromagnetic SMA's, electrorheological (ER) compositions, magnetorheological (MR) compositions, dielectric elastomers, ionic polymer metal composites (IPMC), piezoelectric polymers, piezoelectric ceramics, various combinations of the foregoing materials, and the like.

Shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or martensite phase, shape memory alloys can be plastically deformed and upon exposure to some higher temperature will transform to an austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

Shape memory alloys exist in several different temperature-dependent phases. The most commonly utilized of these phases are the so-called marten site and austenite phases discussed above. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$).

When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). Generally, the shape memory alloys are softer and more easily deformable in their martensitic phase and are harder, stiffer, and/or more rigid in the austenitic phase. In view of the foregoing, a suitable activation signal for use with shape memory alloys is a thermal activation signal having a magnitude to cause transformations between the martensite and austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape that was previously suitable for airflow control.

Intrinsic and extrinsic two-way shape memory materials are characterized by a shape transition both upon heating from the martensite phase to the austenite phase, as well as an additional shape transition upon cooling from the austenite phase back to the martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Shape memory polymers (SMP's) are known in the art and generally refer to a group of polymeric materials that demonstrate the ability to return to a previously defined shape when subjected to an appropriate thermal stimulus. Shape memory polymers are capable of undergoing phase transitions in which their shape is altered as a function of temperature. Generally, SMP's have two main segments, a hard segment and a soft segment. The previously defined or permanent shape can be set by melting or processing the polymer at a temperature higher than the highest thermal transition followed by cooling below that thermal transition temperature. The highest thermal transition is usually the glass transition temperature ($T_g$) or melting point of the hard segment. A temporary shape can be set by heating the material to a temperature higher than the $T_g$ or the transition temperature of the soft segment, but lower than the $T_g$ or melting point of the hard segment. The temporary shape is set while processing the material at the transition temperature of the soft segment followed by cooling to fix the shape. The material can be reverted back to the permanent shape by heating the material above the transition temperature of the soft segment.

For example, the permanent shape of the polymeric material may be a wire presenting a substantially straightened shape and defining a first length, while the temporary shape may be a similar wire defining a second length less than the first. In another embodiment, the material may present a spring having a first modulus of elasticity when activated and second modulus when deactivated.

The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., and most preferably less than or equal to about 120° C. and greater than or equal to about 80° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), ply(butyl methacrylate), poly (isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly (ethylene terephthalate), polyethylene/nylon (graft copolymer), polycaprolactones-polyamide (block copolymer), poly (caprolactone) dimethacrylate-n-butyl acrylate, poly (norbornyl-polyhedral oligomeric silsequioxane), polyvinylchloride, urethane/butadiene copolymers, polyurethane block copolymers, styrene-butadiene-styrene block copolymers, and the like.

Though primarily described with respect to SMA and SMP, as previously mentioned, it is well within the ambit of the invention to use other active materials, such as electroactive polymers (EAP). Electroactive polymers include those polymeric materials that exhibit piezoelectric, pyroelectric, or electrostrictive properties in response to electrical or mechanical fields. Examples of EAP's include ionic polymer metal composites, conductive polymers, piezoelectric material and the like, wherein the term "piezoelectric" is used to describe a material that mechanically deforms when a voltage potential is applied, or conversely, generates an electrical charge when mechanically deformed.

The materials generally employ the use of compliant electrodes that enable polymer films to expand or contract in the in-plane directions in response to applied electric fields or mechanical stresses. An example of an electrostrictive-grafted elastomer with a piezoelectric poly(vinylidene fluoride-trifluoro-ethylene)copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity (for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nano-tubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

With respect to piezoelectric material (PM), it is appreciated that PM may be disposed on strips of a flexible metal or ceramic sheet. The strips can be unimorph or bimorph. Preferably, the strips are bimorphic, because bimorphs generally exhibit more displacement than unimorphs.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion. Unimorphs can exhibit a strain of as high as about 10%, but generally can only sustain low loads relative to the overall dimensions of the unimorph structure. In the present invention, the piezoelectric element may present a pre-stressed unimorph comprising a piezoelectric ceramic layer (for example, lead zirconate titanate), which is electroplated on its two major faces. A metal pre-stress layer is adhered to the electroplated surface on at least one side of the ceramic layer by an adhesive layer. During manufacture, the ceramic, adhesive, and first pre-stress layer are simultaneously heated to a temperature above the melting point of the melting point of the adhesive, and then subsequently allowed to cool, so as to re-solidify and set the adhesive layer. During the cooling process the ceramic layer becomes strained, due to the higher coefficients of thermal contraction of the metal pre-stress layer and the adhesive layer than of the ceramic layer. Also, due to the greater thermal contraction of the laminate materials than the ceramic layer, the ceramic layer deforms into an arcuate shape having a generally concave face.

In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands. Bimorphs can exhibit strains up to about 20%, but similar to unimorphs, generally cannot sustain high loads relative to the overall dimensions of the unimorph structure.

Suitable piezoelectric materials include inorganic compounds, organic compounds, and metals. With regard to organic materials, all of the polymeric materials with non-centrosymmetric structure and large dipole moment group(s) on the main chain or on the side-chain, or on both chains within the molecules, can be used as candidates for the piezoelectric film. Examples of suitable polymers include, for example, but are not limited to, poly(sodium 4-styrene-sulfonate) ("PSS"), poly S-119 (poly(vinylamine)backbone azo chromophore), and their derivatives; polyfluorocarbons, including polyvinylidene fluoride ("PVDF"), its co-polymer vinylidene fluoride ("VDF"), trifluoroethylene (TrFE), and their derivatives; polychlorocarbons, including poly(vinyl chloride) ("PVC"), polyvinylidene chloride ("PVC2"), and their derivatives; polyacrylonitriles ("PAN"), and their derivatives; polycarboxylic acids, including poly(methacrylic acid ("PMA"), and their derivatives; polyureas, and their derivatives; polyurethanes ("PUE"), and their derivatives; bio-polymer molecules such as poly-L-lactic acids and their derivatives, and membrane proteins, as well as phosphate bio-molecules; polyanilines and their derivatives, and all of the derivatives of tetramines; polyimides, including Kapton molecules and polyetherimide ("PEI"), and their derivatives; all of the membrane polymers; poly(N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains, and mixtures thereof.

Further, piezoelectric materials can include Pt, Pd, Ni, Ti, Cr, Fe, Ag, Au, Cu, and metal alloys and mixtures thereof.

These piezoelectric materials can also include, for example, metal oxide such as $SiO_2$, $Al2O_3$, $ZrO_2$, $TiO_2$, $SrTiO_3$, $PbTiO_3$, $BaTiO_3$, $FeO_3$, $Fe_3O_4$, ZnO, and mixtures thereof; and Group VIA and IIB compounds, such as CdSe, CdS, GaAs, $AgCaSe_2$, ZnSe, GaP, InP, ZnS, and mixtures thereof.

Finally, and as previously mentioned, suitable active materials for use in the present invention may also comprise magnetorheological (MR) or electrorheological (ER) compositions, such as MR or ER elastomers. These materials rapidly change their rheological properties upon application of a magnetic field or electric voltage drop. MR elastomers are suspensions of micrometer-sized, magnetically polarizable particles in a thermoset elastic polymer or rubber. The stiffness of the elastomer structure is accomplished by changing the shear and compression/tension moduli by varying the strength of the applied magnetic field. The MR elastomers typically develop structure when exposed to a magnetic field in as little as a few milliseconds. Discontinuing the exposure of the MR elastomers to the magnetic field reverses the process and the elastomer returns to its lower modulus state.

II. Exemplary Systems, Methods, and Applications

Turning to the teachings of the present invention, exemplary embodiments for harvesting, storing and converting energy using active materials, and more preferably the field activated properties of SMP and SMA are discussed below and illustrated in FIGS. 1-6. In each embodiment, an activation signal source 16 is coupled to the element 12 and configured to selectively (e.g., manually, naturally, or in response to sensory technology) generate an activation signal.

The system 10 includes a natural and/or ambient activation signal source 16, such as wind loading, solar radiation and ambient temperature (FIG. 4), vibration, random or periodic (such as in tires) stress or strain, exposure to forces as caused, for example, by seismic displacements or the rotation of a body, exposure to water (swelling, modulus change), and static charge.

Storage mechanisms for use in the present invention include those based upon pseudoplastic/superelastic straining of SMA, SMP latch/locking mechanisms, straining of EAP's, shear thinning of STF fluids, use of MR polymers/ferromagnetic SMA's, and straining piezoelectric/piezoceramic uni- and bimorphic composites.

In a first embodiment shown in FIG. 1, a psuedoplastically strained SMA spring element 12 is presented in its Martensite phase, and connected in series to a biasing spring 18 having a spring modulus in between the Martensitic and Austenitic moduli of the SMA spring 12. It is appreciated that providing the necessary difference in spring moduli between the energy storage and biasing springs 12,18 involves selecting appropriate cross-sectional areas for each spring. For example, where the energy storage spring 12 is formed of SMA material and the biasing spring 18 is formed of SMP material, the energy storage to biasing spring ratio is preferably not less than 1:10: more preferably 1:20, and most preferably 1:50. When the element 12 is heated from below its $A_s$ to above its $A_f$ temperature, it is caused to activate its shape memory and simultaneously increases the spring modulus or stiffness of the spring. These combined conditions in the SMA spring element 12 cause the biasing spring 18 to expand (FIG. 1a).

As previously mentioned, the storage and biasing spring 12,18 are then preferably locked in compressed and expanded conditions, respectively, by a locking mechanism 14. For example, a latch (FIGS. 1-1b), a pawl (FIG. 2), or a ratcheting mechanism (FIG. 3) may be utilized. Where necessary it is appreciated that the locking mechanism 14 includes a fixed base 20 for securing and transferring the biasing force generated by the element 12.

In a preferred embodiment, the locking mechanism 14 may be a pawl comprising SMP material initially at its low temperature high modulus state. For example, the pawl 14 may include a biasing torsion spring 14a formed of SMP and configured to resist rotation in a first direction, as shown in FIG. 2. The torsion spring 14a presents first and second resistances to rotation in the first direction, wherein the first but not the second can be overcome by the shape modifying force of the alloy. When desired, the pawl 14 may further include an obscuring element, such as a sheath 14b, configured to block the exposure of the torsion spring 14a to the Sun, only when in the disengaged orientation (shown in hidden-line type in FIG. 2), so as to present a hold period equal to the transition period of the SMP torsion spring 14a.

As shown in FIG. 3, the gear wheel 22 of a ratchet based locking mechanism 14 may include a tooth 24 made of SMP material. The tooth 24 is caused to undergo a modulus change, so as to present first and second degrees of stiffness, wherein the first but not the second is able to be overcome by the shape modifying force of the SMA storage spring 12. More preferably, the locking mechanism 14 further includes an SMA wire 26 drivenly coupled to the gear wheel 22 (FIG. 3), latch or pawl, and configured to cause or promote disengagement from and therefore the release of energy by the storage element 12, when the wire 26 is activated.

It is appreciated that activation energy can also be locked in by the motion causing physical movement from one to a second stable state of a bi-stable mechanism, such as, for example, the "oil canning" phenomenon. If the biasing spring (or wire) 18 is also formed of SMA in its Martensite phase, it is appreciated that energy may also be stored in the biasing element 18 through its pseudoplastic deformation (i.e., stretching). In FIG. 2, fore example, structure 20 defines an obscuring element 20b configured to block exposure of the biasing spring from the Sun, when compressed.

Release of the energy so stored could then be variously through the release of the locking mechanism 14 (manually, electro-mechanically, shape change in an active material, etc.), or thermal activation of the biasing SMP (or SMA) spring 18. With further respect to the locking mechanisms 14 shown in FIGS. 1-3, the energy stored by stretching the biasing spring/wire 18 element may be released through thermal, light, or moisture activated phase change (softening) of the active material or otherwise release thereof.

Alternatively, the biasing spring 18 (or an equivalent wire) may be formed of SMP material. In this configuration, it is appreciated that heating the SMP biasing spring 18 and SMA spring 12 simultaneously or the SMP spring 18 initially, past their respective transition temperatures, softens the SMP material turning it into a very low stiffness biasing spring. This allows the SMA spring 12 to stretch, and in so doing release the potential energy stored in the original pseudoplastically deformed state of the SMA spring 12. When heated, the SMP biasing spring 18 exhibits a modulus even lower than that of the low modulus of the SMA spring 12, which enables the storage spring 12 to be returned to the expanded condition, regardless of its state.

In this example the SMP biasing spring 18 serves as a reverse actuator, i.e. blocking motion when cold, which motion/actuation stroke is released when it is heated and thus softened. Thus, the use of SMP in various geometrical forms in its high modulus state as a blocking mechanism to physically block motion is contemplated. It is then the switch of the SMP to its lower modulus state (variously through thermal, light, or moisture activation) that defeats its blocking capability and thus allows the stored energy to be converted and released.

In an embodiment shown in FIG. 4, an SMP element 12 starts in an unstrained lower modulus state. The SMA element 12 is positioned/attached so as to be pseudoplastically strained by a naturally occurring (e.g., air or water flow) or otherwise provided actuating force. This pseudoplastically stored actuation energy can then be released through thermal activation of the shape memory effect in the SMP either passively by temperature changes in the environment, direct solar loading (FIG. 4), focused solar radiant energy, etc. or actively through Joule heating. In FIG. 4, for example, energy from water flow and waves is harvested by a breaker 12 comprising the active material. When the breaker 12 is passively heated it becomes less stiff thereby allowing more water to flow, and during high tide (night operation) becomes more stiff and erect, so as to retain a higher water level.

In another unstrained SMA Martensite state and solar loading embodiment, the SMA element 12 may be used to effect selective deployment of a shade or sunscreen that would otherwise be manually deployed. For example, as shown in FIG. 4a, a thermally activated SMA element 12 in series with a biasing spring may be used to effect the self-opening and self-closing of a sun shade, such as a beach umbrella, residential canopy or the like. Storage, in this configuration, may be effected by a light activated latch that engages the spring 18 when the umbrella is opened.

In another embodiment, the SMA element 12 starts in the Austenitic high modulus phase, and is positioned/attached so as to be superelastically strained by a naturally occurring or otherwise provided actuating force (FIG. 4). Straining the element 12, in this phase, results in stress induced phase change from the Austenitic to Martensitic phase. In this configuration, super-elastically induced deformation can be locked in by the locking mechanism 14 (e.g., a latch, a pawl, or a ratchet based mechanism). It can also be locked in by the motion causing physical movement from one to a second stable state of a bi-stable mechanism (e.g., the two stable states of a curved cross section spring steel tape measure). Again, a pawl or other mechanism 14 made of SMP initially at its low temperature high modulus state may be used to lock in the "elastic" energy, wherein release of the energy so stored could then be variously through the release of the locking mechanism 14 (manually, electro-mechanically, "kinking" of the curved spring steel tape measure cross section, or activating through thermal, light, or moisture activation, so as to cause a phase change (softening) in the SMP pawl mechanism).

Two exemplary applications of thermal energy sources/sinks for the energy storage and release cycles when SMA/SMP based mechanisms are used as energy sources, not of the mechanization to deform elements or generate (electrical or mechanical) energy out of the device, include in a first configuration, sunlight or earth-heat being used as the medium/energy source for the high temperature/energy release portion of the cycle with SMA and SMP, and the energy storage portion of the cycle for SMP; and (sea)water (or ambient air temp) as the low temperature source for the energy storage portions of the cycle in both SMA and SMP (in stationary applications, it is appreciated that weight/gravity could also be used to deform elements with SMA cold and SMP hot).

In a second application, automotive exhaust heat (or hot coolant) may be used as one medium (high temperature for the energy release portion of the cycle with SMA and SMP, and the energy storage portion of the cycle for SMP), and ambient air (or cold coolant or HVAC refrigerant fluid) may be used as the other medium (low temperature for the energy storage portions of the cycle in both SMA and SMP).

In another automotive application shown in FIG. 5, sunshade deployment may be achieved through the passive heating of an SMA actuator 28. The actuator 28 may be used to harvest and store solar energy to effect deployment of a cover or shade 30. This could be done in either a single step or in multiple steps through for example a ratcheting type mechanism. Direct solar heating of the SMA material may be through direct exposure (FIG. 5) to and/or focusing through a lens or prism of sunlight, solar heating of a fluid (not shown) in which the SMA is immersed, or heat transfer by conduction from exterior panels (also not shown) under direct solar load. Stowing of the shade 10 may also be achieved through either passive solar heating of an SMA based release latch preferably exposed upon entry into the vehicle 32, or actively by the driver performing an action (e.g., pressing a button, opening a door, etc.) that generates an activation signal or in an alternative embodiment releases a locking pin holding the shade closed after solar exposure has ceased.

In this configuration, multi-step energy storage could be effected by passively causing an obscuring element 34 to move at each step, so as to incrementally block the solar loading of the actuator 28, thereby allowing it to cool down. The movement of the obscuring element 34 further exposes to direct solar loading a secondary actuator 36 that is linked to the obscuring element 34. Heating of this secondary SMA actuator 36 would then cause the obscuring element 34 to move out of the blocking position allowing reheating and re-actuation of the primary actuator linked to the shade 30, such that a cyclic process continues until either full stroke of the energy storage device was reached or direct solar loading ended.

In yet another embodiment, the activation signal may be provided by forced deformation (external actuators) if the element 12 is used as a separate actuator, and centrifugal forces if used on a rotating object (e.g., engine component) directly. For example, and as shown in FIG. 6, where the system 10 is used as a "torque overboost" on a flywheel 38, centrifugal force may be used to activate the element 12, so as to vary flywheel inertia by purposely relocating flywheel mass.

Finally, it is appreciated that the system 10 may be coupled with a Sterling-motor or hot air motor (not shown) presenting appropriate efficiency and cycle times, for example, as a start-up device for low-end torque, or again, as a torque overboost.

Thus, as shown in the illustrated embodiments, natural and/or ambient energy may be passively stored and passively released, passively stored and actively released, or actively stored and passively released. It is appreciated that more energy will be either actively or passively stored than provided to release the energy. Both passive and active means of activation are comprehended depending on the application and embodiment. It is also appreciated that in terms of energy conversion efficiencies for SMA, an SMA actuator is effectively a heat engine in which the SMA converts thermal energy directly into work. The efficiency of the actuator can thus not be greater than that of the Carnot cycle, which is no more than about 10% in the typical temperature operating range of SMA.

Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. A method of harvesting, storing and converting energy from a natural energy source, utilizing an active material energy storage element, said method comprising the steps of:
   exposing the element to an activation signal produced by the energy source and having energy;
   harvesting the energy by reversibly changing and activating the element, as a result of exposure to the signal over a first period, so as to achieve a modified condition;
   storing the energy by directly engaging and mechanically locking the element in the modified condition; and
   converting the stored energy to work over a second period spaced from the first period, by occluding the element from the signal and unlocking the element.

2. The method as claimed in claim 1, wherein the storing element comprises a psuedoplastically strained shape memory alloy in its martensite phase, the element is connected in series to a biasing element, and causes the biasing element to store energy in the modified condition.

3. The method as claimed in claim 2, wherein the storing element presents a spring having differing activated and deactivated moduli.

4. The method as claimed in claim 3, wherein the biasing element further presents a spring made of a shape memory polymer having a deactivated modulus greater than the activated and deactivated moduli of the storing spring, so as to present a reverse actuator, and an activated modulus less than the deactivated and greater than the activated modulus of the storing spring, so as to selectively convert energy when deactivated.

5. The method as claimed in claim 1, wherein a locking mechanism selected from the group consisting of latches, pawls, and ratcheting mechanisms engages the storing element, so as to retain the element in the modified condition.

6. The method as claimed in claim 5, wherein the locking mechanism is a pawl comprising SMP in its low temperature high modulus phase, and energy is released as a result of heating the pawl, so as to change the SMP to its low modulus phase.

7. The method as claimed in claim 5, wherein the locking mechanism further includes an SMA wire attached to the latch, pawl, or ratcheting mechanism, and heating the wire further enables the energy to be released.

8. The method as claimed in claim 5, wherein the locking mechanism includes a one-way ratcheting mechanism having a gear wheel comprising SMP, and energy is converted as a result of heating the wheel and transitioning the SMP.

9. The method as claimed in claim 1, wherein the signal is produced by sunlight or earth-heat, and the storing element is exposed to water or ambient air conditions to convert the energy.

10. The method as claimed in claim 9, wherein the storing element is drivenly coupled to a sun umbrella, and is operable to effect the self-opening or self-closing of the umbrella when activated, and the umbrella includes a locking mechanism configured to store the energy.

11. The method as claimed in claim 10, wherein the signal is produced by centrifugal force, the storing element is attached to the flywheel of a vehicle, and operable to relocate flywheel mass, so as to serve as a torque booster.

12. The method as claimed in claim 1, wherein the signal is produced by a force, gravity or weight.

13. The method as claimed in claim 1, wherein the storing element is coupled to a Sterling-motor.

14. The method as claimed in claim 1, wherein the element consists of material selected from the group consisting essentially of shape memory alloys, shape memory polymers, shape memory ceramics, electroactive polymers, piezoelectric composites, and magneto and electro-rheological composites.

15. A method of harvesting naturally occurring energy utilizing a shape memory alloy element in an initial unstrained Martensite state, said method comprising the steps of:
   exposing the element to a naturally occurring condition having energy;
   harvesting and storing a portion of the energy by autonomously absorbing said portion with, so as to pseudoplastically strain the element over a first period; and
   converting the portion of energy to work by exposing the element to an activation signal over a second period spaced from the first period.

16. The method as claimed in claim 15, wherein the condition is selected from the group consisting of an air flow, water flow, seismic earth displacement, and the rotation of a body.

17. The method as claimed in claim 15, wherein the signal is produced through direct solar loading, or focused solar radiant energy.

18. A method of harvesting naturally occurring energy utilizing a shape memory alloy element in an initial high modulus Austenitic phase, said method comprising the steps of:
   exposing the element to a naturally occurring condition having energy;
   harvesting and storing a portion of the energy by autonomously straining the element, so as to cause a stress induced phase change to the Martensitic phase, absorbing said portion with, so as to superelastically strain, the element and locking the element when strained with a locking mechanism over a first period;

converting the portion of energy to work by releasing the mechanism over a second period spaced from the first period.

19. The method as claimed in claim 18, wherein the element is configured so as to change from one of two stable states of a bi-stable mechanism.

* * * * *